United States Patent
Nemoto et al.

(10) Patent No.: US 9,255,792 B2
(45) Date of Patent: Feb. 9, 2016

(54) OPTICAL PROBE, ATTACHABLE COVER, AND SHAPE MEASURING APPARATUS

(71) Applicant: MITUTOYO CORPORATION, Kanagawa (JP)

(72) Inventors: Kentaro Nemoto, Kawasaki (JP); Masaoki Yamagata, Kawasaki (JP); Eisuke Moriuchi, Kawasaki (JP); Tadashi Iwamoto, Hino (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/612,467

(22) Filed: Feb. 3, 2015

(65) Prior Publication Data

US 2015/0226543 A1  Aug. 13, 2015

(30) Foreign Application Priority Data

Feb. 7, 2014 (JP) .................................. 2014-022768

(51) Int. Cl.
| | |
|---|---|
| *G01B 11/24* | (2006.01) |
| *G01B 11/30* | (2006.01) |
| *G02B 1/11* | (2015.01) |
| *G01B 11/02* | (2006.01) |

(52) U.S. Cl.
CPC .............. *G01B 11/30* (2013.01); *G01B 11/026* (2013.01); *G01B 11/24* (2013.01); *G02B 1/11* (2013.01)

(58) Field of Classification Search
CPC ............................... G01N 21/01; G01N 21/474
USPC .................................................. 356/600–613
See application file for complete search history.

(56) References Cited

U.S. PATENT DOCUMENTS

| | | | | |
|---|---|---|---|---|
| 6,031,615 A | * | 2/2000 | Meeks et al. ......... | G01B 11/303 250/559.28 |
| 7,639,373 B2 | * | 12/2009 | Torii et al. .......... | G01B 11/0608 356/614 |
| 8,553,234 B2 | | 10/2013 | Nemoto et al. | |
| 8,964,281 B2 | | 2/2015 | Yamagata et al. | |
| 2013/0083384 A1 | | 4/2013 | Yamagata et al. | |
| 2014/0232855 A1 | | 8/2014 | Yamagata et al. | |
| 2014/0253724 A1 | | 9/2014 | Yamagata et al. | |

FOREIGN PATENT DOCUMENTS

JP  2012-230097  11/2012

* cited by examiner

*Primary Examiner* — Gregory J Toatley
*Assistant Examiner* — Iyabo S Alli
(74) *Attorney, Agent, or Firm* — Greenblum & Bernstein, P.L.C.

(57) ABSTRACT

An optical probe includes a probe cover, within which is installed an optical system having an illuminating optical system and a receiving optical system. An emitting region and an incidence region through which light passes are provided to a bottom surface of the probe cover, the bottom surface forming an opposing region opposite a work piece. The bottom surface forms a surface where, of the light reflected from the work piece, light following a direct reflection direction is reflected in a direction moving away from the incidence region, from a position where light emitted from the emitting region is emitted at the work piece. Accordingly, an amount of second order reflected light striking the incidence region can be suppressed and, therefore, an occurrence of an erroneous value in received light distribution can be suppressed.

12 Claims, 10 Drawing Sheets

OPTICAL PROBE, ATTACHABLE COVER, AND SHAPE MEASURING APPARATUS

CROSS-REFERENCE TO RELATED APPLICATIONS

The present application claims priority under 35 U.S.C. §119 of Japanese Application No. 2014-022768, filed on Feb. 7, 2014, the disclosure of which is expressly incorporated by reference herein in its entirety.

BACKGROUND OF THE INVENTION

1. Field of the Invention

The present disclosure relates to an optical probe or the like measuring a shape of a measured object without contacting the measured object.

2. Description of Related Art

Conventional examples of a non-contact measuring apparatus measuring a shape of a measured object include a device employing a light-section measurement method. In the light-section method, light having a linear shape is emitted at the measured object and the reflected light is received by a two-dimensional photoreceiver element, for example. Received light distribution obtained by the photoreceiver element is amplified by an amplifier, after which it is digitalized and a cross-sectional shape of the measured object is detected based on a peak position in the digital data.

Japanese Patent Laid-open Publication No. 2012-230097 discloses, for example, an optical probe that includes a DMD (Digital Micro-mirror Device) selectively reflecting light having a linear shape based on a line direction of the light and emitting the light at a measured object. The DMD does not emit light at a predetermined region selected from a single line where the light is emitted on a surface region of the measured object. Therefore, the DMD can inhibit the occurrence of erroneous values (false images) due to light received from multiple reflections (see, e.g., paragraphs [0008] and [0026] of the specification of Japanese Patent Laid-open Publication No. 2012-230097).

One circumstance of multiple reflection is that, in a case where a surface of a measured object has comparatively high reflectivity (i.e., is a mirror surface), for example, directly reflected light from the measured object returns to the probe, then that light is further reflected by the probe and is directed toward the measured object. When such reflection subsequent to reflection off the probe is defined as second order reflection, a photoreceptor element receives the second order reflected light, and thus an erroneous value occurs in the received light distribution.

The present disclosure provides an optical probe, an attachable cover, and a shape measuring apparatus capable of inhibiting an occurrence of an erroneous value in received light distribution due to second order reflected light even when a surface of a measured object has comparatively high reflectivity.

SUMMARY OF THE INVENTION

An optical probe according to one aspect of the present disclosure includes a probe cover and an optical system. The probe cover includes an opposing region opposite a measured object, and an emitting region and an incidence region through which light passes, the emitting region and the incidence region being provided to the opposing region. The optical system is provided within the probe cover, emits light via the emitting region, and receives light reflected by the measured object via the incidence region. At least the opposing region of the probe cover includes a surface where, of the reflected light, light following a direct reflection direction is reflected in a direction moving away from the incidence region, from a position where light emitted from the emitting region is emitted at the measured object.

The opposing region of the probe cover includes a surface where, of the reflected light, light following the direct reflection direction is reflected in a direction moving away from the incidence region. Therefore, an amount of second order reflected light striking the incidence region can be suppressed. Accordingly, even in a case where a surface of a measured object has comparatively high reflectivity, an occurrence of an erroneous value in received light distribution can be inhibited.

The surface may be a flat plane formed to span from the emitting region to the incidence region and not perpendicular with respect to an emission optical axis of the optical system. Accordingly, a surface can be achieved where, of the reflected light, light following the direct reflection direction is reflected in a direction moving away from the incidence region, from the position where light emitted from the emitting region is emitted at the measured object.

The flat plane may also be provided at an angle of 45° or greater and 85° or less with respect to the emission optical axis. When the angle of the plane relative to the emission optical axis is greater than 85°, reflecting, of the reflected light, the light following the direct reflection direction in a direction moving away from the incidence region becomes substantially more difficult. When the angle of the plane relative to the emission optical axis is less than 45°, measurement light that is to strike the incidence region may no longer strike adequately, and the shape measurement may be effectively impossible to perform.

The surface may also be a projecting surface either provided so as to span from the emitting region to the incidence region or provided between the emitting region and the incidence region. Alternatively, the surface may be a crank-shaped (i.e., stepped) surface provided so as to span from the emitting region to the incidence region and form a step. Accordingly, a surface can be achieved where, of the reflected light, light following the direct reflection direction is reflected in a direction moving away from the incidence region, from the position where light emitted from the emitting region is emitted at the measured object.

The optical probe may also further include an attachable cover provided so as to be attachable and detachable with respect to the probe cover such that the opposing region is covered, the attachable cover including a surface where, of the reflected light, light following a direct reflection direction is reflected in a direction moving away from the incidence region. By mounting the attachable cover on a probe cover not having this surface, an amount of second order reflected light striking the incidence region can be suppressed and an occurrence of erroneous values in received light distribution can be suppressed.

An attachable cover according to another aspect of the present disclosure includes a mounting portion and an opposing portion. The mounting portion is capable of connecting to a probe cover that includes an opposing region opposite a measured object, and an emitting region and an incidence region through which light passes, the emitting region and the incidence region being provided to the opposing region. The opposing portion includes an opening facing each of the emitting region and the incidence region so as to allow passage of emitted light from the emitting region and measurement light striking the incidence region in a state where the attachable cover is mounted on the probe cover so as to cover the opposing region. In addition, the opposing portion includes a surface where, of the light reflected from the measured object, light following a direct reflection direction is reflected in a direction moving away from the incidence region, from a position where light emitted from the emitting region is emitted at the measured object.

An opposing portion of the attachable cover includes a surface where, of the reflected light, light following the direct reflection direction is reflected in a direction moving away from the incidence region. Accordingly, even in a case where the surface of the measured object has comparatively high reflectivity, the occurrence of second order reflected light can be inhibited and, as a result, the occurrence of erroneous values in the received light distribution can be suppressed.

An encasement structure of at least the opposing region of the probe cover may also be configured by a reflection prevention structure or a diffusion structure.

A shape measuring apparatus according to another aspect of the present disclosure includes the optical probe, a stage, and a measurement processor. A measured object is placed on the stage. The measurement processor measures a shape of the measured object placed on the stage based on signals obtained by the optical probe.

According to the present disclosure, even in a case where a surface of a measured object has comparatively high reflectivity, an occurrence of an erroneous value in received light distribution due to second order reflected light can be inhibited.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present disclosure are described with reference to the drawings.

First Embodiment

Figure 1:
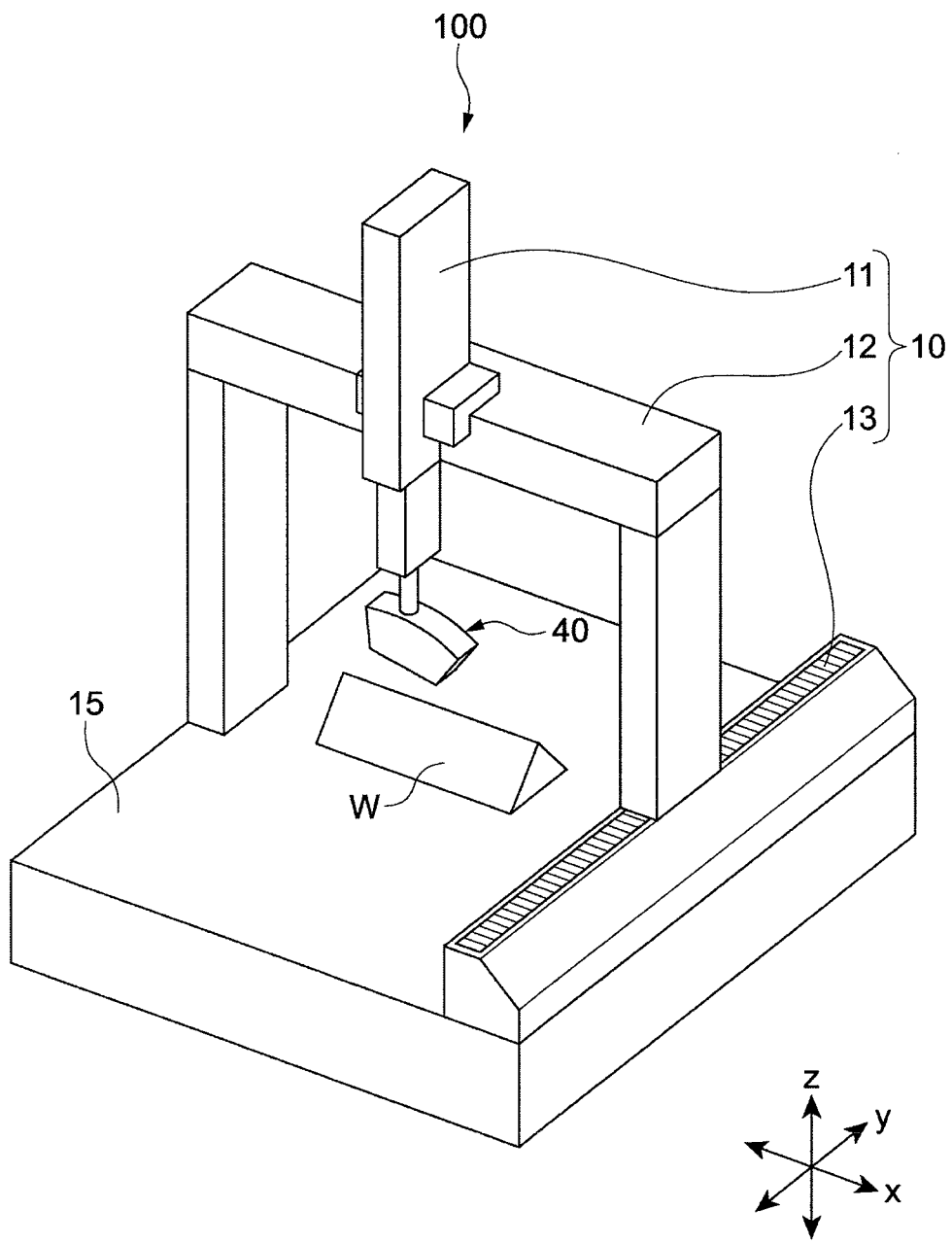
FIG. 1 is a perspective view primarily illustrating a shape measuring apparatus according to an embodiment of the present disclosure.

FIG. 1 is a perspective view primarily illustrating a shape measuring apparatus according to an embodiment of the present disclosure. A shape measuring apparatus 100 includes an optical probe (hereafter referred to as a "probe") 40, a stage 15, and a displacement mechanism 10.

A work piece W is placed on the stage 15 as a measured object. The displacement mechanism 10 is configured to enable the probe 40 to be displaced in three dimensions (X, Y, Z). Specifically, the displacement mechanism 10 includes a Z displacement mechanism 11 displacing the probe 40 along the Z direction; an X displacement mechanism 12 displacing the Z displacement mechanism 11 along the X direction; and a Y displacement mechanism 13 integrally displacing the Z displacement mechanism 11 and the X displacement mechanism 12 in the Y direction.

The shape measuring apparatus 100 is connected to a control device (not shown in the drawings) configured by a computer, for example. The control device controls driving of the displacement mechanism 10. In addition, the control device includes a measurement processor measuring a shape of the work piece W based on signals obtained from the probe 40. Information generated by the measurement processor is displayed on a display (not shown in the drawings).

Figure 2:
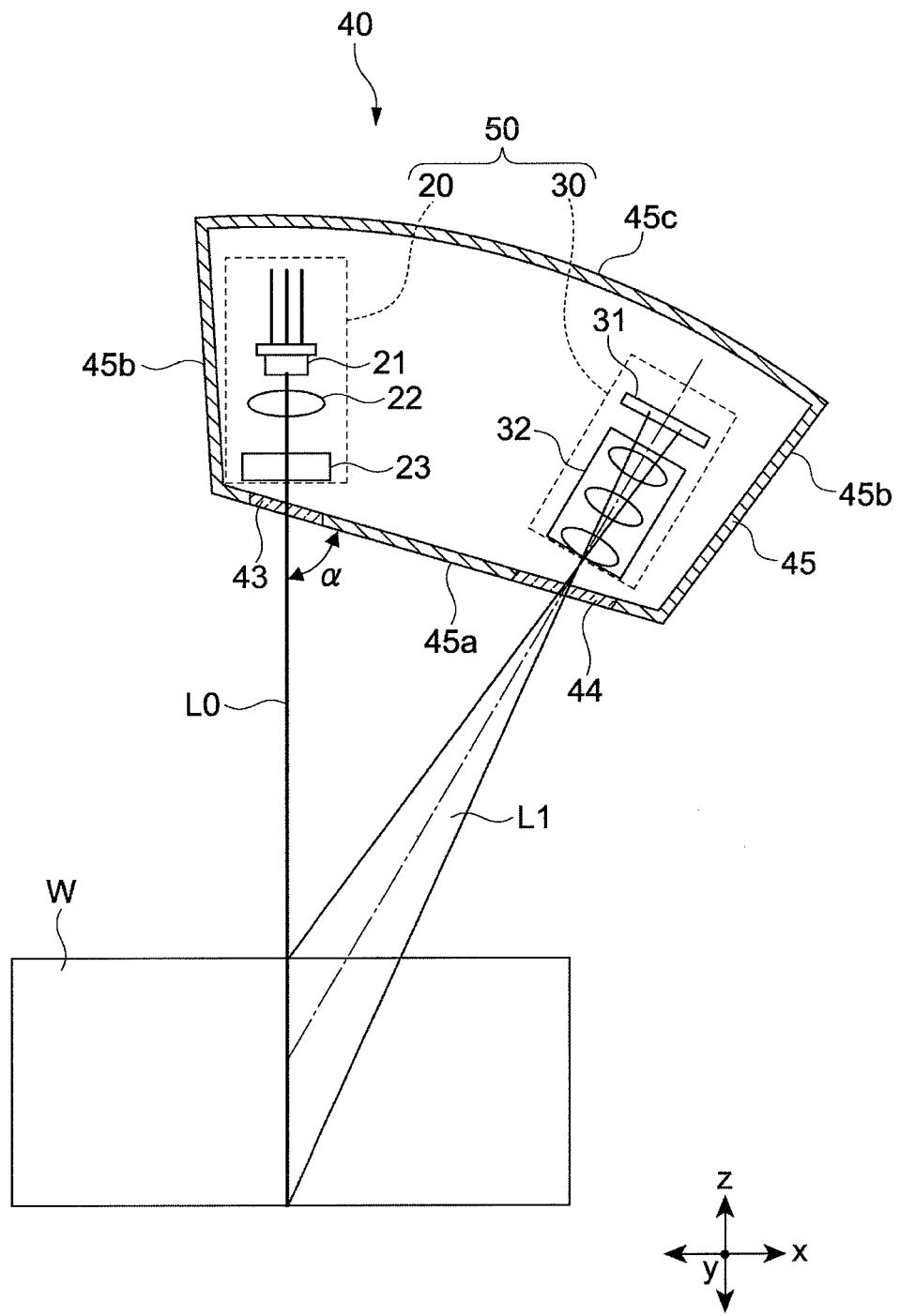
FIG. 2 is a cross-sectional view schematically illustrating a configuration of an optical probe according to a first embodiment of the present disclosure.
Figure 3:
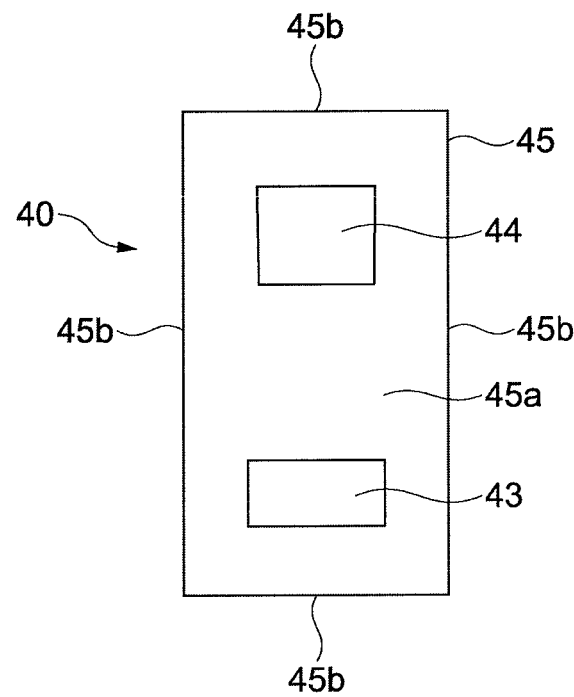
FIG. 3 is a bottom surface view of the optical probe shown in FIG. 2.

FIG. 2 is a cross-sectional view schematically illustrating a configuration of the probe 40. FIG. 3 is a view from a bottom surface 45a of the probe 40. The probe 40 includes a probe cover 45 and an optical system 50 installed within the probe cover 45.

The probe cover 45 includes four side surfaces 45b, an arc-shaped top surface 45c (shown in FIG. 2), and a planar bottom surface 45a. The bottom surface 45a forms an opposing region opposite the work piece W placed on the stage 15. The top surface 45c may also have a straight line shape, or any other shape, instead of the arc shape.

The optical system 50 includes an illuminating optical system 20 and a receiving optical system 30. The illuminating optical system 20 includes a laser diode 21 as a light source; a collimator lens 22 rendering laser light from the laser diode 21 into parallel light; and a linear light generating element 23 generating a line-shaped laser L0 in one direction (herein, the Y direction) from the parallel laser light. A rod lens, for example, is used as the linear light generating element 23.

The receiving optical system 30 includes an imaging lens unit 32 having a plurality of lenses, and an image capture element 31. Examples of the image capture element 31 used may include a CCD (Charge Coupled Device) or a CMOS (Complementary Metal-Oxide Semiconductor) device.

The laser light emitted from the illuminating optical system 20 is emitted via an emitting region 43 provided to the bottom surface 45a of the probe cover 45. The emitted laser light L0 is emitted at the work piece W as a line laser. Reflected light L1 reflected by the work piece W strikes the receiving optical system 30 via an incidence region 44 provided to the bottom surface 45a of the probe cover 45.

The probe cover 45 is configured with resin or metal as a primary material. The emitting region 43 and the incidence region 44 are configured with a material transparent to the laser light generated by the illuminating optical system 20. The material configuring the emitting region 43 and the incidence region 44 is an acrylic or glass in a case where the laser light is visible light, for example.

Moreover, at least one of the emitting region 43 and the incidence region 44 may be an aperture formed by having an opening in the probe cover 45.

Figure 4:
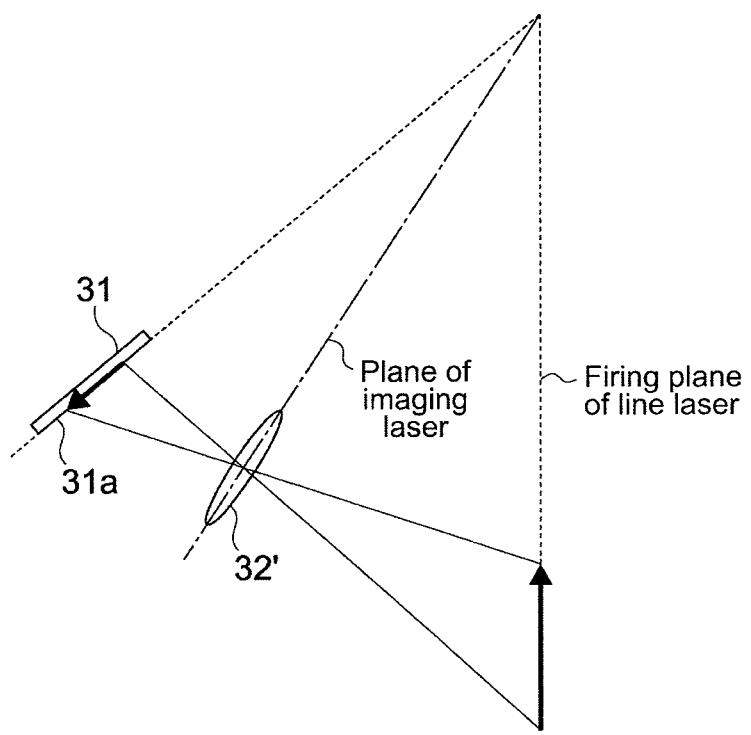
FIG. 4 is an explanatory diagram illustrating a principle underlying a Scheimpflug optical system.

A principle underlying a Scheimpflug optical system is applied to the optical system 50 of the probe 40. FIG. 4 is an explanatory diagram illustrating the Scheimpflug optical system. The Scheimpflug principle states that in a case where an image capture plane 31a of the image capture element 31, a principal plane that includes a focal point of an imaging lens 32', and a firing plane (also referred to as the emitting plane) of the line laser emitted at the work piece W are each positioned so as to extend and intersect at a straight line (single point in FIG. 4), the entire image capture plane 31a of the image capture element 31 is in focus. In the present embodiment, by using the Scheimpflug optical system, the entire image capture plane 31a is in focus in the Y and Z directions in a range where the line laser is emitted.

Figure 5A:
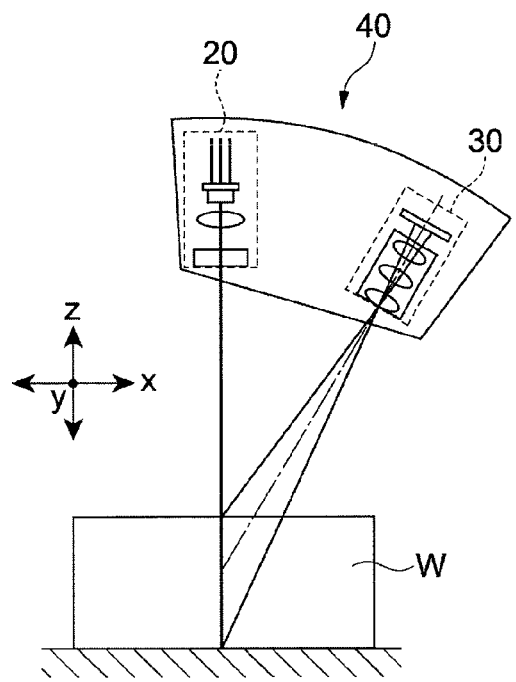
FIGS. 5A and 5B are, respectively, a Y direction and an X direction view of a state where a line laser bombards a triangular columnar work piece W.
Figure 5B:
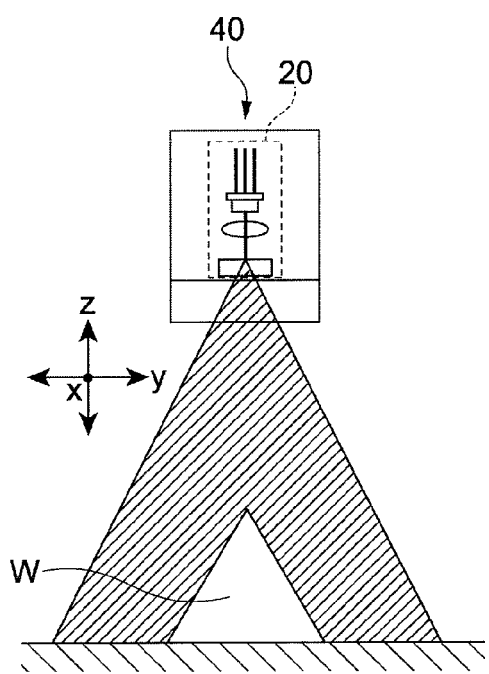
Figure 5C:
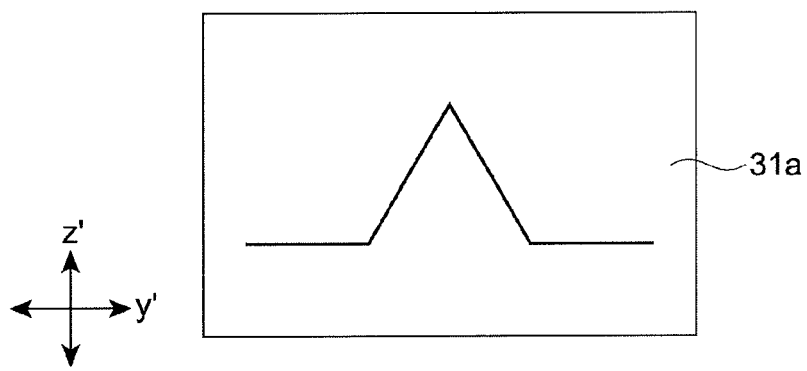
FIG. 5C is an observed image of the work piece obtained on an image capture plane of an image capture element.

FIGS. 5A and 5B are, respectively, a Y direction and an X direction view of a state where the line laser from the probe 40 is emitted at the work piece W having, for example, a triangular columnar shape. FIG. 5C is an observed image of the work piece obtained on the image capture plane 31a of the image capture element 31 in such a case.

The shape of the work piece W in the Y direction (line direction of the line laser) corresponds to a shape of a Y' direction signal on the image capture plane 31a. The shape of the work piece W in the Z direction of the line laser corresponds to a shape of a Z' direction signal on the image capture plane 31a. Due to the X displacement mechanism 12 scanning the probe 40 in the X direction, the entire shape of the work piece W can be measured. Spatial coordinate values calculated based on (a trajectory of) a peak value of an amount of light received for each pixel obtained by the image capture element 31 form the measured shape.

Peak detection is performed by the measurement processor. For example, the measurement processor detects a pixel position having a peak value (i.e., a peak position) from among a row of pixels along the Z' direction on the image capture plane 31a. By repeating this process along a direction orthogonal to the row of pixels (i.e., along the Y' direction), shape measurement can be performed for one line.

Herein, in a case where the work piece has a surface with high diffusion, a diffusion component of the light reflected by the surface of the work piece W is stronger while a reflected component (herein, a reflected component that is nearly a direct reflection) is weaker. Moreover, multiple reflection attenuates the light commensurate with the number of reflections. Therefore, a second order reflection following reflection off the probe cover does not have sufficient intensity to be mistakenly detected as a peak.

Figure 6A:
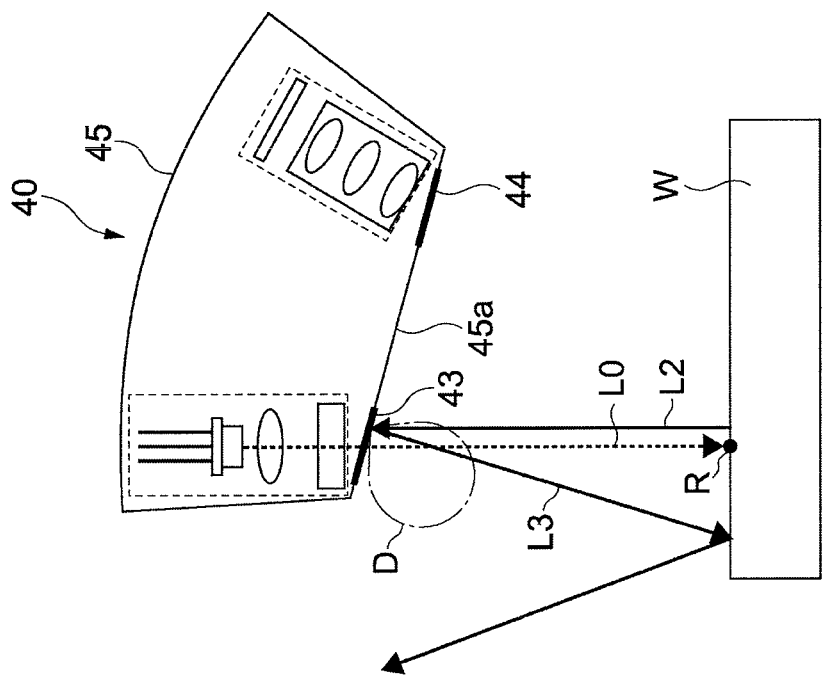
FIG. 6A is an explanatory diagram illustrating a circumstance that arises when measuring a work piece having a mirror surface.

However, a case where the work piece W has a surface with a comparatively high reflectivity, such as a mirror surface, for example, gives rise to the following situation. FIG. 6A illustrates this situation. As shown in the drawing, when the laser light L0 emitted from an optical probe 110 is emitted at the work piece W having the mirror surface, the intensity of reflected light L2 in the direct reflection direction is greater. On the bottom surface of the probe 110, the reflected light L2 is reflected by an emitting region of an illuminating optical system 112 and a surrounding area, and that reflected light L3 is once again emitted at the work piece W. Specifically, a second order reflection occurs on the bottom surface of the probe 110. An area where the second order reflection occurs is demarcated in the drawing by reference character D. When an image capture element catches light belonging to the second order reflected light reflected by the work piece W and incident on a receiving optical system 113 of the probe 110, an image of the light is a false image and is mistakenly detected as a peak, thus leading to an erroneous value.

Figure 7:
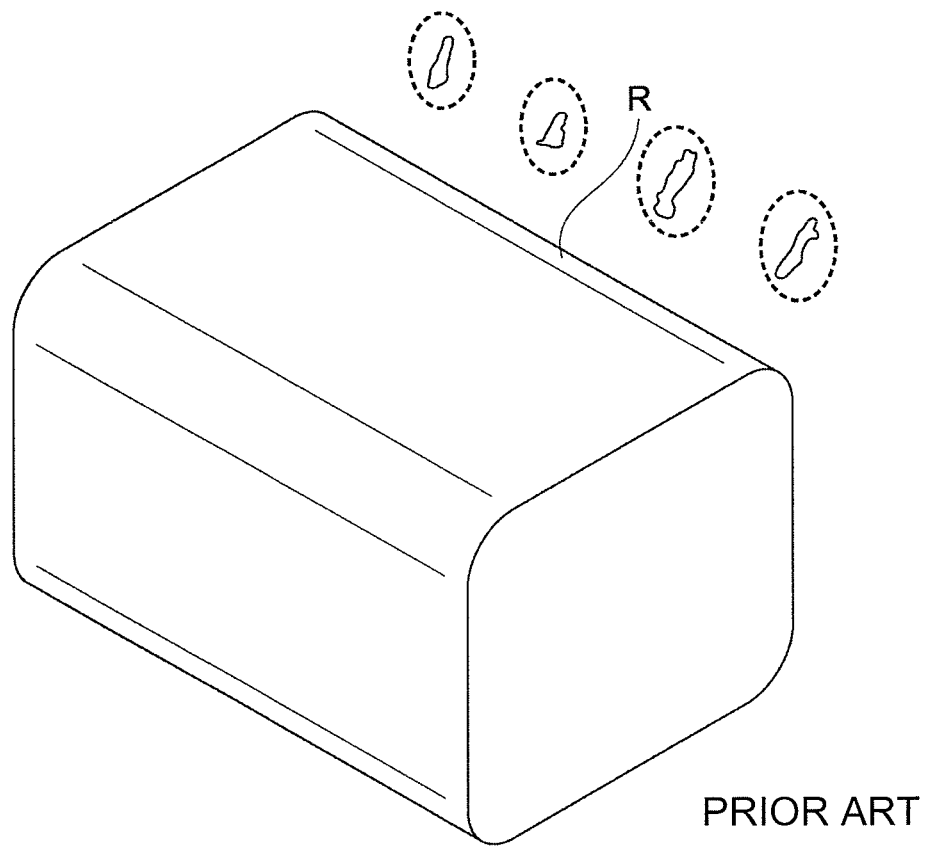
FIG. 7 illustrates an exemplary image for shape measurement results for a work piece having a mirror surface, using a conventional probe.

FIG. 7 illustrates an exemplary image of shape measurement results for a work piece having a mirror surface using a conventional probe. The shape of the work piece is, for example, a rectangular parallelepiped having an angle R. As shown in the drawing by the portions delineated by dashed lines, due to the occurrence of second order reflection, erroneous values (false images) for a received light distribution are detected at portions of the work piece having the angle R.

Figure 6B:
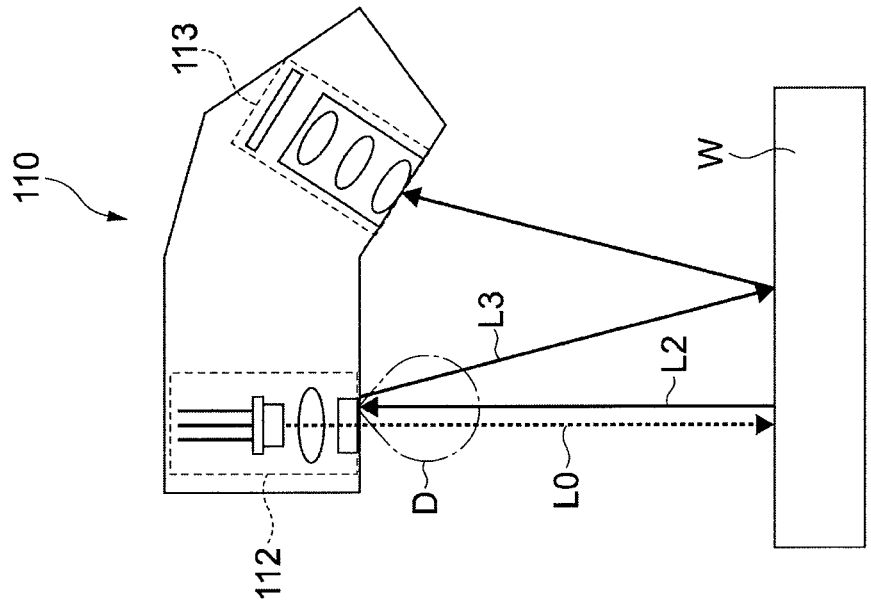
FIG. 6B is an explanatory diagram illustrating how the circumstance can be resolved.

As shown in FIG. 6B, in order to prevent the occurrence of such erroneous values, the bottom surface 45a of the probe cover 45 according to the present embodiment is configured by a surface where, of the light reflected off the work piece, the light L2 following the direct reflection direction (Z direction in FIG. 2) is reflected from a point R, which is a position where the laser light L0 from the emitting region 43 is emitted at the work piece W (incidence position), in a direction moving away from the incidence region 44 (toward the left in the drawing).

One example of such a surface configures the bottom surface 45a with a flat plane formed so as to span at least from the emitting region 43 to the incidence region 44 and not perpendicular (i.e. the flat plane is oblique) with respect to an emission optical axis (Z direction). Specifically, as shown in FIG. 2, the bottom surface 45a is formed by an inclined surface having a predetermined angle α with respect to the emission optical axis.

As shown in FIG. 6B, with the bottom surface 45a configured in this way, the high intensity reflected light L2 following the direct reflection direction strikes the bottom surface 45a of the probe cover 45, and a range D where the reflected light L3 occurs is oriented away from the incidence region 44. Accordingly, an amount of the reflected light L2 (high intensity second order reflected light) striking the incidence region 44 can be suppressed. Specifically, even in a case where a surface of the work piece W has comparatively high reflectivity, an occurrence of an erroneous value in received light distribution can be suppressed, and measurement data can achieve better accuracy and higher quality.

The angle α is defined to be, for example, 45° or greater and 85° or less. When the angle α is greater than 85°, approaching a right angle, reflecting the light following the direct reflection direction from the work piece W away from the incidence region 44 becomes substantially more difficult. When the angle α is less than 45°, measurement light that is to strike the incidence region 44 may no longer strike adequately, and the shape measurement may be effectively impossible to perform.

In addition, the conventional probe required work to verify the occurrence of and eliminate erroneous values; however, such work is unnecessary in the present embodiment and so work time can be reduced and workload can be alleviated.

Second Embodiment

Hereafter, a probe according to a second embodiment of the present disclosure is described. In the description that follows, identical reference numerals are assigned to elements that are essentially similar to components and functions encompassed by the probe 40 according to the embodiment depicted in FIG. 1 and elsewhere. A description of these elements is simplified or omitted in the interest of focusing on dissimilar features.

Figure 8:
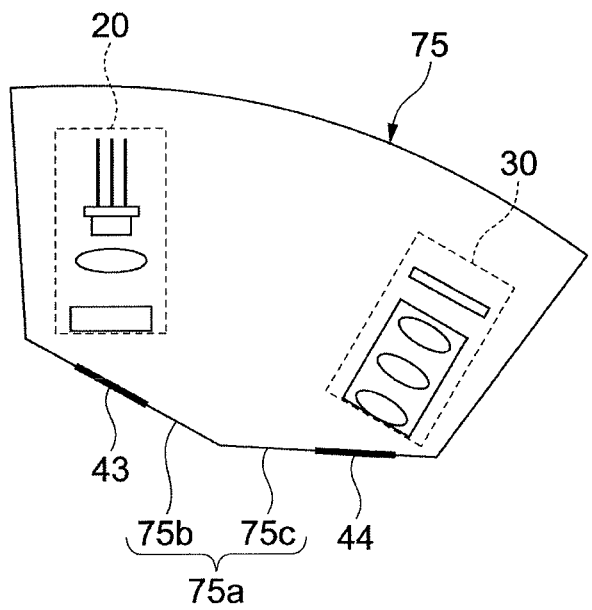
FIG. 8 illustrates an optical probe according to a second embodiment of the present disclosure.
Figure 9:
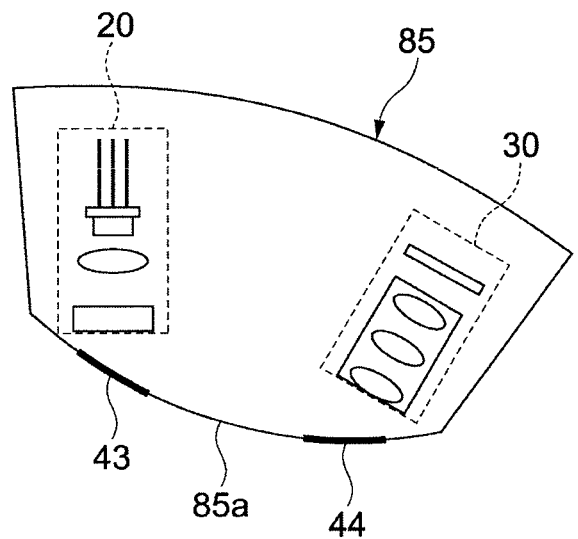
FIG. 9 illustrates another exemplary optical probe according to the second embodiment of the present disclosure.

Bottom surfaces of probe covers 75 and 85, for embodiments shown in FIGS. 8 and 9 respectively, each have a projecting surface 75a and 85a, respectively, provided so as to span from the emitting region 43 to the incidence region 44 or provided between the emitting region 43 and the incidence region 44.

The projecting surface 75a formed on the bottom surface of the probe cover 75 according to the example shown in FIG. 8 is configured by two inclined surfaces, 75b and 75c. The two inclined surfaces 75b and 75c are each flat planes, and are provided so as to intersect between the emitting region 43 and the incidence region 44.

Moreover, an exterior profile as viewed from the bottom surface-side of the probe cover 75 shown in FIG. 8 may, in practice, be rectangular or any other polygonal shape. Alternatively, the exterior profile may be circular or elliptical, and a projecting surface of the bottom surface may be conical or elliptically conical in shape.

The projecting surface 85a formed on the bottom surface of the probe cover 85 according to the example shown in FIG. 9 is configured by a circular or elliptical arc. An exterior profile viewing the probe cover 85 from the bottom surface-side may be rectangular or any other polygonal shape. Alternatively, the exterior profile may be configured by a circle, ellipse, or the like.

Figure 10:
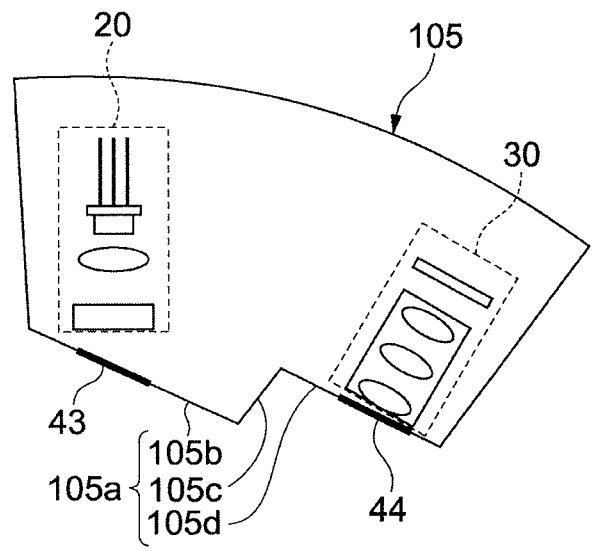
FIG. 10 illustrates yet another exemplary optical probe according to the second embodiment of the present disclosure.

A bottom surface of a probe cover 105 according to an example shown in FIG. 10 includes a crank-shaped surface 105a provided so as to span from the emitting region 43 to the incidence region 44 and between the emitting region 43 and the incidence region 44. More specifically, the crank-shaped surface 105a includes an inclined surface 105b, a step surface 105c, and an inclined surface 105d. The inclined surface 105b is a surface that includes the emitting region 43, while the inclined surface 105d is a surface that includes the incidence region 44. The step surface 105c is a surface forming a step between the inclined surfaces 105b and 105d. Each of the surfaces 105b, 105c, and 105d may be curved surfaces. A height of the step surface 105c is defined to a height sufficient to avoid a path of the measurement light striking the incidence region 44.

The projecting surfaces 75a and 85a and the crank-shaped surface 105a, each configured as noted above, performs in a manner similar to the probe cover 45 according to the first embodiment to reflect the high intensity light reflected from the work piece, which follows the direct reflection direction, from a bombardment position on the work piece in a direction away from the incidence region 44. Thereby, the occurrence of erroneous values in the received light distribution can be suppressed.

Third Embodiment

Figure 11:
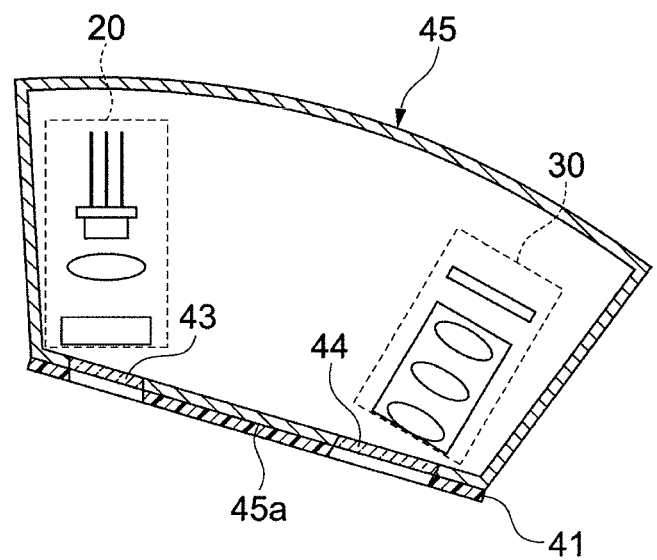
FIG. 11 illustrates an optical probe according to a third embodiment of the present disclosure.

Hereafter, a probe according to a third embodiment of the present disclosure is described. FIG. 11 illustrates the probe according to the third embodiment of the present disclosure.

A probe cover for this probe is the probe cover 45 according to the first embodiment, described above, having the bottom surface 45a formed by a flat, inclined plane. A light reflection prevention structure 41 is provided to the bottom surface 45a. A reflection prevention film, for example, can be used as the reflection prevention structure 41.

The reflection prevention film is formed on regions of the bottom surface 45a, excluding the emitting region 43 and the incidence region 44.

The reflection prevention film is a film configured by a low-reflectivity material capable of reducing the influence of second order reflected light and is, for example, configured by a single layer or multiple layers of a material such as oxides or fluorides of Mg, Zr, Ti, or Si. Alternatively, the reflection prevention film may also be a photo-absorbent material having a nanostructure.

Of the light reflected from the work piece, reflection of high intensity light following the direct reflection direction is inhibited by the reflection prevention structure 41 of this kind, thereby inhibiting the occurrence of second order reflected light.

Instead of the reflection prevention structure 41, a diffusion structure diffusing light may be provided to the bottom surface 45a of the probe cover 45. A surface forming the diffusion structure is rough surface machined or hologram processed, for example. Examples of rough surface machining include sandblasting, or machining unevenness having a shape with a desired design. The occurrence of second order reflected light is inhibited by a diffusion structure of this kind, as well.

The structure (material) of at least a bottom portion (opposing region) of the probe cover may also be a reflection prevention structure or a diffusion structure. Specifically, an encasement structure of at least the bottom portion of the probe cover may also be configured by the reflection prevention structure or the diffusion structure. Naturally, the encasement structure of the entire probe cover may also be configured by the reflection prevention structure or the diffusion structure.

The reflection prevention structure 41 or the diffusion structure are applied to the probe cover 45 according to the first embodiment described above; however, the structures are not limited to this and may also be applied to the projecting surfaces 75a and 85a and the crank-shaped surface 105a formed on the bottom surface of the probe covers 75, 85, and 105, respectively, shown in FIGS. 8 to 10. In such a case, a structure of the bottom portion of the probe cover, which includes the projecting surfaces or the crank-shaped surface, may also be a reflection prevention structure or a diffusion structure.

Fourth Embodiment

Hereafter, a probe according to a fourth embodiment of the present disclosure is described. The probe according to the present embodiment includes an attachable cover 60 capable of attaching and detaching with respect to a probe cover.

Figure 12A:
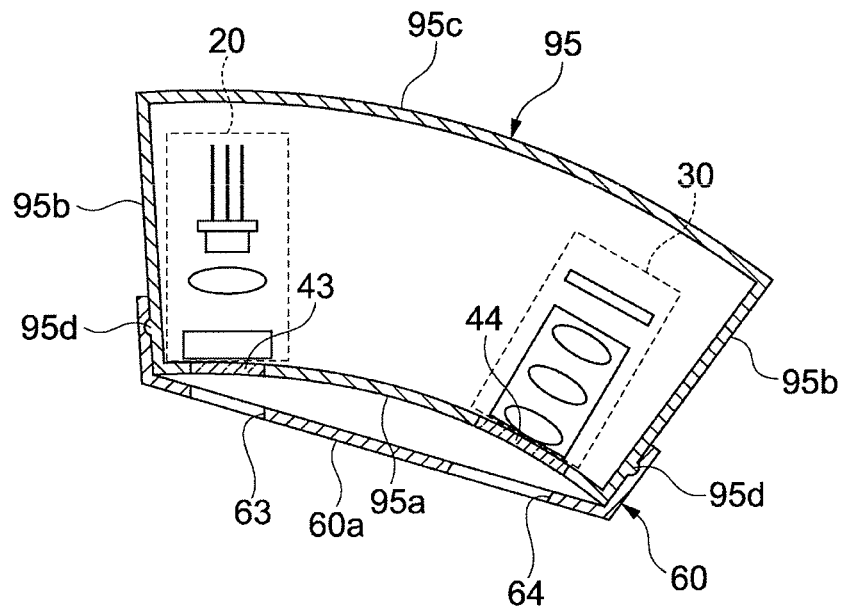
FIGS. 12A and 12B illustrate an optical probe according to a fourth embodiment of the present disclosure.
Figure 12B:
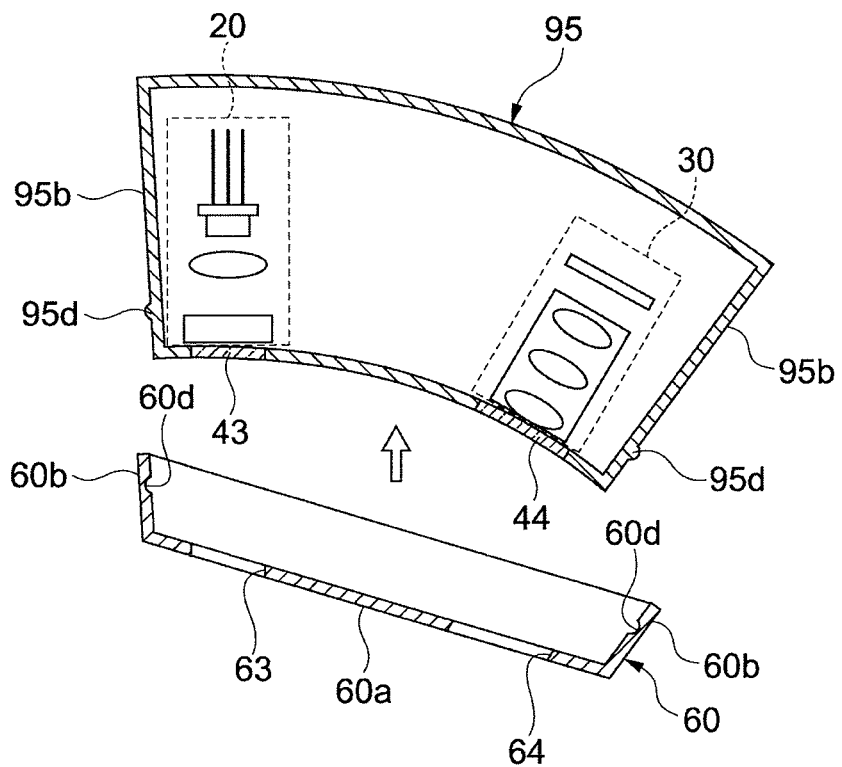

FIGS. 12A and 12B illustrate one specific example of a probe to which the attachable cover 60 has been mounted. As shown in FIG. 12A, the attachable cover 60 is mounted to a probe cover 95 for this probe such that a bottom surface 95a (opposing region opposite the work piece) is covered. The bottom surface 95a has an arced shape similar to that of a top surface 95c, for example. As shown in FIG. 12B, a projection 95d is provided to a bottom portion of side surfaces 95b of the probe cover 95, the projections 95d being capable of connecting by latching to an indentation 60d (mounting portion) provided on an inner surface of side walls 60b of the attachable cover 60. The projections 95d are provided on a portion or around the entire periphery of the side surfaces 95b, and the indentations 60d are provided at positions corresponding to those of the projections 95d. In this way, the attachable cover 60 can be attached and detached with respect to the probe cover 95.

Openings 63 and 64 are provided to the attachable cover 60. Specifically, the openings 63 and 64 are provided at positions facing the emitting region 43 and the incidence region 44, respectively, so as to allow transmission of (so as to not obstruct) emitted light from the emitting region 43 and measurement light striking the incidence region 44. A component configured by a light-transmissive material may also be provided at the openings 63 and 64. The bottom surface 60a (opposing portion facing the work piece) of the attachable cover 60 is configured with an inclined surface having an action similar to that of the bottom surface 45a of the probe cover 45 according to the first embodiment. Specifically, the inclined surface reflects light following the direct reflection direction from the work piece in a direction away from the incidence region 44 (see FIG. 6B).

In the present embodiment, projections may instead be provided to the inner surface of the side walls 60b of the attachable cover 60 and indentations provided to the side walls of the probe cover 95.

Figure 13:
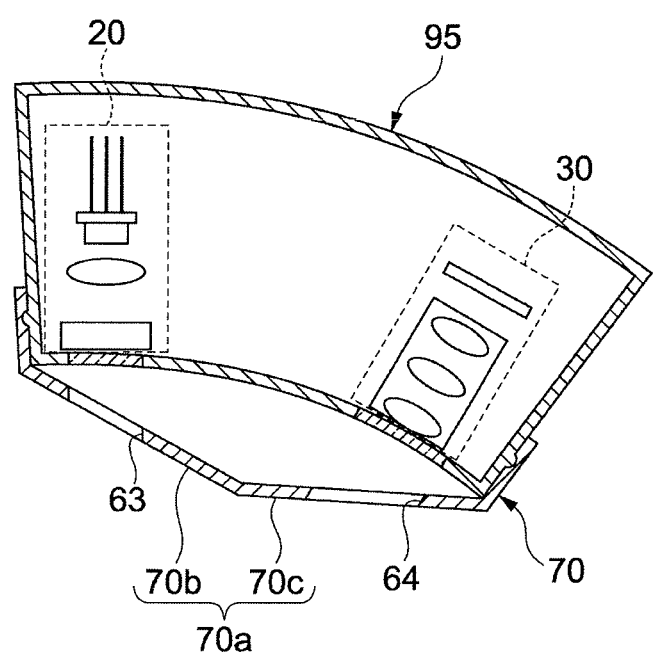
FIG. 13 illustrates another exemplary optical probe according to the fourth embodiment of the present disclosure.

FIG. 13 illustrates a probe to which another example of an attachable cover is mounted. The probe cover 95 for this probe is similar to the probe cover 95 shown in FIGS. 12A and 12B. A bottom surface 70a of an attachable cover 70 is configured with a projecting surface 70a having two inclined surfaces, 70b and 70c. The projecting surface 70a has, for example, a shape substantially similar to that of the projecting surface 75a of the bottom surface of the probe cover 75 shown in FIG. 8.

The shape of the projecting surface 70a is not limited to that shown in FIG. 13, and can instead apply the shape of any of the bottom surfaces described in the second embodiment (FIGS. 8 to 10).

The reflection prevention structure 41 or the diffusion structure shown in the third embodiment may also be provided to the bottom surface 60a of the attachable cover 60, the projecting surface 70a of the attachable cover 70, or the like according to the fourth embodiment, described above. The structure of at least the bottom portion of the attachable cover may also be a reflection prevention structure or a diffusion structure.

A "mount" mechanism described above in the fourth embodiment is configured by latching the projections 95d with the indentations 60d. However, the present invention is not limited to this. A screw mechanism may also be used, or a contact mechanism using a material having a high friction coefficient, such as rubber.

With an attachable cover such as that according to the present embodiment, the attachable cover can be attached even to a probe already having a probe cover, for example, thereby achieving a probe capable of inhibiting second order reflection.

Other Embodiments

The present invention is not limited to the above-described embodiments, and various other embodiments can be used.

In the above-noted embodiment, various surfaces configuring the surface of the probe cover are described as a "top surface," "bottom surface," and "side surface;" however, this notation is used merely to facilitate understanding. For example, in a case where, rather than being attached to the shape measuring apparatus 100 as shown in FIG. 1, a probe is attached to a multi joint arm and a worker manually operates the arm to perform measurement, an orientation of the probe is not restricted to up/down and left/right directions but instead may have an arbitrary orientation.

The laser diode 21, which generates coherent light, is used as the light source of the illuminating optical system 20 according to the above-described embodiment; however, an LED (Light Emitting Diode) or the like may also be used.

The linear light generating element 23 according to the above-described embodiment is a rod lens; however, instead, a light scanning element capable of scanning light in a linear shape may also be used, such as a DMD, a galvano-mirror element, or a polygonal mirror element.

The probe according to the above-described embodiment applies the principle of a Scheimpflug optical system; however, the probe is not necessarily limited to this and may instead employ a generic, reflection-type light sensor.

The shape of the probe cover 95 shown in FIGS. 12A, 12B, and 13 is not limited to the arced block shape. For example, the overall shape of the probe cover may also be a rectangular parallelepiped and the bottom surface (opposing region) may be configured by a plurality of planes.

In the shape measuring apparatus 100 according to the above-described embodiment, the probe is oriented such that the emission optical axis of the illuminating optical system 20 lies along the Z direction; however, the probe may also be oriented such that the emission optical axis is inclined.

At least two characteristic features of each embodiment described above may also be combined.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. An optical probe comprising:
   a probe cover comprising:
      an opposing region opposite an object to be measured;

an emitting region through which an emission light passes through; and an incidence region through which light that is reflected by the object passes, wherein the emitting region and incidence region are provided in the opposing region; and a light emitter provided within the probe cover and configured to emit the emission light towards the object via the emitting region, and a light receiver provided within the probe cover and configured to receive the light reflected by the object via the incidence region, wherein the opposing region of the probe cover includes a surface configured such that, when the light reflected by the object hits against the surface and does not pass through the incidence region, the light hitting the surface is reflected again from the surface of the opposing region in a direction moving away from the incidence region and is not received by the light receiver.

2. The optical probe according to claim 1, wherein:

the surface is a flat plane spanning from the emitting region to the incidence region, and the surface is oblique to an emission optical axis of the light emitter.

3. The optical probe according to claim 2, wherein the flat plane is at an angle of 45° or greater and 85° or less with respect to the emission optical axis.

4. The optical probe according to claim 1, wherein the surface is a projecting surface which is one of:

spanning from the emitting region to the incidence region, and provided between the emitting region and the incidence region.

5. The optical probe according to claim 1, wherein the surface is a stepped surface spanning from the emitting region to the incidence region.

6. The optical probe according to claim 1 further comprising an attachable cover which is attachable and detachable with respect to the probe cover so as to cover the opposing region, the attachable cover having a surface where, of the reflected light, light following a direct reflection direction is reflected in a direction moving away from the incidence region.

7. An attachable cover comprising:

a mount configured to connect the attachable cover to a probe cover, the probe cover including an opposing region opposite an object to be measured, and an emitting region through which an emission light passes through, and an incidence region through which light that is reflected by the object passes, wherein the emitting region and incidence region are provided in the opposing region; and an opposing portion comprising:

an opening facing each of the emitting region and the incidence region to allow passage of the emission light from the emitting region and a measurement light striking the incidence region in a state where the attachable cover is mounted on the probe cover to cover the opposing region; and a surface configured such that, when the light reflected by the object hits against the surface and does not pass through the incidence region, the light hitting the surface is reflected again from the surface of the opposing portion in a direction moving away from the incidence region and is not received by a light receiver provided within the probe cover.

8. The attachable cover according to claim 7, wherein:

the surface is a flat plane spanning from the emitting region to the incidence region, and the surface is oblique to an emission optical axis of a light emitter provided within the probe cover, the light emitter configured to emit light via the emitting region, and the light receiver is configured to receive light reflected by the measured object via the incidence region.

9. The attachable cover according to claim 8, wherein the flat plane is at an angle of 45° or greater and 85° or less with respect to the emission optical axis.

10. The attachable cover according to claim 7, wherein the surface is a projecting surface which is one of:

spanning from the emitting region to the incidence region, and provided between the emitting region and the incidence region.

11. The attachable cover according to claim 7, wherein the surface is a stepped surface spanning from the emitting region to the incidence region.

12. A shape measuring apparatus comprising:

an optical probe comprising:

a probe cover having an opposing region opposite an object to be measured, and further having an emitting region through which an emission light passes through and an incidence region through which light that is reflected by the object passes, wherein the emitting region and incidence region are provided in the opposing region; and a light emitter provided within the probe cover and configured to emit the emission light towards the object via the emitting region, and a light receiver provided within the probe cover and configured to receive the light reflected from the object via the incidence region;

a stage configured to accept the measured object thereon; and a measurement processor configured to measure a shape of the measured object placed on the stage based on signals obtained by the optical probe, wherein the opposing region of the probe cover includes a surface configured such that, when the light reflected by the object hits against the surface and does not pass through the incidence region, the light hitting the surface is reflected again from the surface of the opposing region in a direction moving away from the incidence region and is not received by the light receiver.

* * * * *